Patented July 19, 1927.

1,636,563

UNITED STATES PATENT OFFICE.

CHARLES B. HILL, OF GLENCOE, AND MAURICE H. GIVENS, OF EVANSTON, ILLINOIS, ASSIGNORS TO NORTHWESTERN YEAST COMPANY, OF CHICAGO, ILLINOIS, A CORPORATION OF ILLINOIS.

PROCESS FOR MANUFACTURING YEAST FOAM MALTED MILK AND PRODUCT THEREOF.

No Drawing.  Application filed March 12, 1926. Serial No. 94,316.

This invention relates to the production of yeast foam malted milk. It is a modification of and improvement upon the process and product of our prior application No. 2,296, filed January 14, 1925.

The objects of the invention are to provide: (1) an improved, more economical process for producing the desired product, and particularly to eliminate more easily alcohol from the final product; (2) an improved final product which may be kept in either a liquid or a dry state; (3) an intermediate product, usable in either a liquid or dry state as a food, combinable in either of these conditions with milk in a wet or dry state, and preservable under all conditions.

Broadly the invention consists in means attaining the foregoing and other objects. More specifically, the invention consists in growing yeast on cereals in such a manner that the combined product without separation of the cereal from the yeast is, after heat treatment, an edible food, even though it is not suitable for leavening purposes in baking.

The invention further consists in the production of such a product, combinable in either a dry or liquid state with milk in either a dry or liquid state to produce a concentrated, highly nutritious food, specifically, yeast foam malted milk.

The temperature limitations employed, which determine the character of the product, are of importance.

The general nature of the process of this invention and of a particular product which may be made thereby having been indicated, a particular process which is within the invention will now be described, to wit:

To 3 lbs. of wheat flour and 1 lb. of malt flour, add 2,473 cubic centimeters of water at 90° F. and thoroughly mix. When the temperature of this mixture has dropped to 88–86° F., add to it, say, 252 cubic centimeters of a 10–20% suspension of live yeast cells. Hold this temperature of 88–86° F. for 4 hours, thereby necessarily producing some alcohol. Now mash the material by adding 2,103 cubic centimeters water at 160° F. and raise gradually the temperature of the whole mixture to 160° F. and hold it there for 15 to 30 minutes. Now gradually raise the temperature to 190–206° and hold this temperature for 30–60 minutes, thereby finishing gelatinizing the cereals, sterilizing the mixture and driving off the alcohol. Designate the product at the end of this time "A". "A" is sterile and can be partially neutralized if necessary or desired, now or at some later time. Further "A" can be dried or bottled or canned in the liquid state and then Pasteurized so that in either form it can be used as a food as it stands.

When milk is to be added, if necessary, partially neutralize the mixture "A" and to it add 4,206 cubic centimeters Pasteurized milk. Hold the whole mixture at 160° F. for at least 30 minutes, thus again Pasteurizing it. Now preserve this final product in either the liquid or dry state; in the liquid state by sterilization in a proper container, or in the dry state by dehydrating by either the commercial hot roll or vacuum process. This final product is the improved yeast foam malted milk of this invention. The combining of product "A" with milk may take place on the completion of the production of product "A" or may take place long afterwards.

While best results are obtained by using wheat flour, desirable results may be obtained by using rye, barley, or oat or other cereal flour.

While best results are obtained by the use of whole milk, there is nothing in principle to prevent the use of some of the well known milk derivatives, such, for instance, as skimmed milk and butter or powdered milk, without departing from the broad invention.

It is to be understood that, where in the description and claims the expression "milk" is used, we intend thereby to mean either skimmed, partly skimmed, whole milk or reconstructed milk; and that, where the expression "malted cereal" is used, we mean thereby a malted cereal of any kind or a combination of malted cereals or a derivative therefrom or an extract of the same, the essential characteristic being that the cereal or cereals, the derivative or extract be rich in enzymes. Also, it is to be understood that, where in the description and claims the expression "cereal flour" is used, we mean thereby the whole grain of any cereal crushed, or ground into flour.

Having thus described our invention, what we claim as new and desire to secure by Letters Patent is:

1. The process of manufacturing a food product consisting in growing yeast in and on a nutritive medium of cereal flour treated with a malt cereal, then mashing the mixture, neutralizing if necessary, and subjecting it to high heat to stop yeast growth, fermentation, dissipate alcohol, and sterilize the product.

2. The process of manufacturing a food product consisting in growing yeast in and on a nutritive medium of cereal flour treated with a malt cereal, then mashing the mixture, neutralizing if necessary, and drying it by high heat sufficient to stop yeast growth, fermentation, dissipate alcohol, and sterilize the product.

3. The process of manufacturing a food product consisting in growing yeast in and on a nutritive medium of cereal flour treated with a malt cereal, then mashing the mixture, neutralizing if necessary, and subjecting it to high heat to stop yeast growth, fermentation, dissipate alcohol, and sterilize the product, adding milk and holding the mixture at a temperature at 160° for at least thirty minutes.

4. The process of manufacturing a food product consisting in growing yeast in and on a nutritive medium of cereal flour treated with a malt cereal, then mashing the mixture, neutralizing if necessary, and drying it by high heat sufficient to stop yeast growth, fermentation, dissipate alcohol, and sterilize the product, adding milk and holding the mixture at a temperature of 160° for at least thirty minutes.

5. The process of manufacturing a food product consisting in growing yeast in and on a nutritive medium of cereal flour treated with a malt cereal, mashing the mixture, neutralizing if necessary, subjecting it to high heat to stop yeast growth, fermentation, dissipate alcohol, and sterilize the product, adding milk and holding the mixture at a temperature of 160° for at least thirty minutes, and then drying.

6. The process of manufacturing a food product consisting in growing yeast in and on a nutritive medium of cereal flour treated with a malt cereal, mashing the mixture, neutralizing if necessary, drying it by high heat sufficient to stop yeast growth, fermentation, dissipate alcohol, and sterilize the product, adding milk and holding the mixture at a temperature of 160° for at least thirty minutes, and then drying.

7. A food product of the character described, consisting of yeast-fermented-malt-treated-alcohol-free-gelatinized-cereals.

In witness whereof, we have hereunto subscribed our names.

CHARLES B. HILL.
MAURICE H. GIVENS.